Aug. 10, 1965   A. C. WENTING II, ETAL   3,199,245
FISH BAIT PROCESS AND PRODUCT
Filed Feb. 4, 1964   2 Sheets-Sheet 1

INVENTOR.
ADRIAN C. WENTING II
CLIFFORD RITTER
BY
ATTORNEYS

Aug. 10, 1965  A. C. WENTING II, ETAL  3,199,245
FISH BAIT PROCESS AND PRODUCT
Filed Feb. 4, 1964  2 Sheets-Sheet 2

INVENTOR.
ADRIAN C. WENTING II
CLIFFORD RITTER
BY
ATTORNEYS

United States Patent Office 3,199,245
Patented Aug. 10, 1965

3,199,245
FISH BAIT PROCESS AND PRODUCT
Adrian C. Wenting II, and Clifford Ritter, Muskegon, Mich., assignors to Wenting Building & Manufacturing Company, Muskegon, Mich., a corporation of Michigan
Filed Feb. 4, 1964, Ser. No. 342,438
2 Claims. (Cl. 43—55)

This invention relates to a unique live bait assembly for fishing and more particularly to a wax worm packaging and storage process, a wax worm package and assembly.

The live bait business normally requires substantial effort for the bait shop owner to maintain bait worms under proper life-sustaining conditions. Fishermen therefore normally purchase bait worms the day of fishing. The fisherman often purchases more of the bait items than needed, or worse yet, less than needed. If purchased earlier, he must care for the worms to keep them alive. This is always a nuisance, and sometimes an impossibility, especially over an extended time.

When fishing, the fisherman must dig around into the dirt-filled container of worms. The worms cause squeamish persons, such as ladies and children, to refuse to bait their own hook. In brief, from start to finish, live bait worms present a considerable nuisance under normal conditions.

It is an object of this invention to provide a unique method of packaging, storing, handling and dispensing live bait worms that remove substantially all of the undesirable and/or distracting factors.

It is another object of this invention to provide a live bait packaging and storage assembly that enables the fisherman to purchase any desired quantity of bait worms and keep them for an extended period of time, at least several months. The fisherman is thus independent of the bait stand on or around the day of fishing. Moreover, the packaged bait assembly requires no interim care by the fisherman to keep the bait alive and healthy.

It is another object of this invention to provide a live bait package assembly requiring no significant human packaging effort, yet being in conveniently useable condition in special containers, with each bait worm individually retained and enclosed for selective use. The bait can be neatly and cleanly stored for immediate use. The desired number of worms are available at any particular chosen time.

These and several other objects of this invention will become apparent upon studying the following specification in conjunction with the drawings in which.

Figure 1:
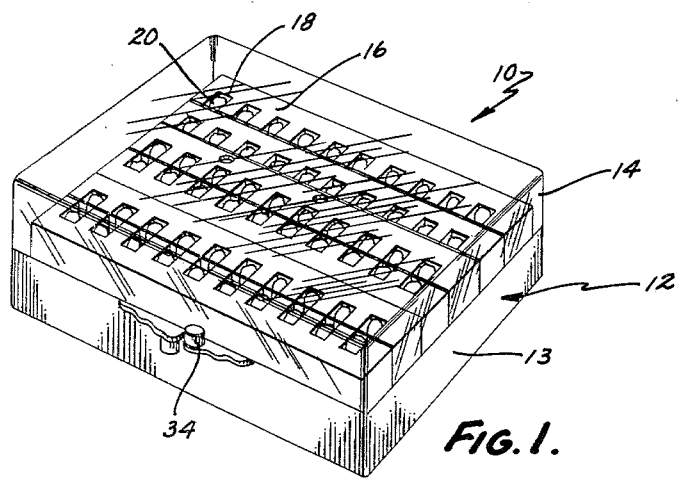
FIG. 1 is a perspective view of the complete packaged bait assembly.
Figure 2:
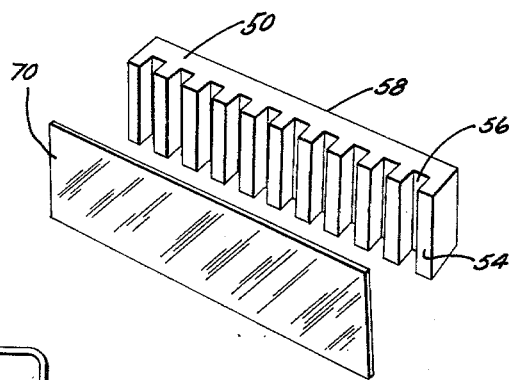
FIG. 2 is a fragmentary view of a portion of the assembly in FIG. 1, showing one of the interfitting elements and one of the separator sheets therefor.

Referring now specifically to the drawings, the complete live bait assembly 10 includes a container 12 having a base 13 and a cover 14. The container encloses a plurality of elongated, grooved elements 16 forming wax worm cells 18 therebetween, and containing individual wax worms 20 in cocoon form.

Figure 3:
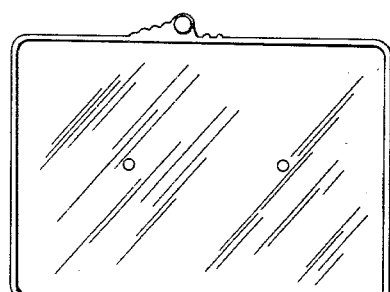
FIG. 3 is a plan view of the package in FIG. 1, with the cover open.

The hollow base 13 includes a bottom 22 (FIG. 5) and a peripheral integrally connected wall 24. The cover is similar to the base, including a top 26 and an integral peripheral wall 28. The cover is hingedly attached to the base by hinges 30, so that it may be moved from the closed position illustrated in FIG. 1 to the open position illustrated in FIGS. 3 and 5.

Figure 5:
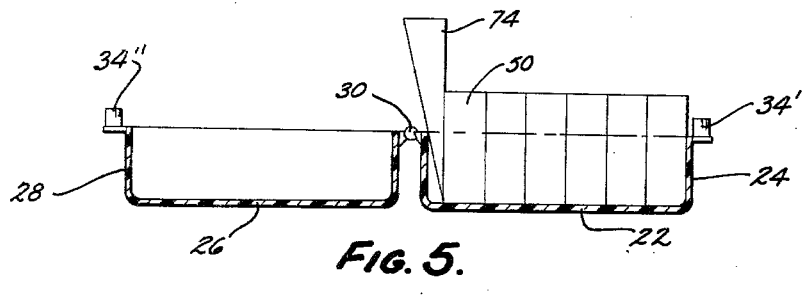
FIG. 5 is a sectional, side elevational view of the package shown just prior to packaging.

Preferably, the cover and base are of plastic materials such as polymethyl methacrylate, with the top preferably being transparent. However, these are optional since other suitable materials may be used. The base and cap are normally held engaged by a simple friction closure latch 34 with one bottom portion 34' engaging the top and the top portion 34" engaging the bottom (FIG. 5).

Both the bottom and the top include vent openings 38 and 40, respectively (FIG. 6), to prevent suffocation of the wax worms when in the closed container.

Figure 4:
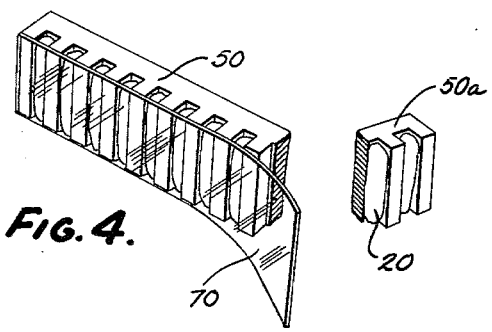
FIG. 4 is a fragmentary perspective view of one of the elements in FIG. 1 as containing the wax worms and ready for use.

Inside the container is a plurality of elongated, like, generally rectangular-shaped, insert block elements 50, 50', etc. placed on one of their long side edges in the base, side by side, and normally in back to front relationship. Alternatively, they may be in front to front relationship. One face 54, called the front face for convenience, has a plurality of elongated grooves 56 extending through the depth of the block element from top to bottom. The plurality of grooves in each element preferably are formed in only one face, with the opposite face 58 being plane. The grooves may be formed in both opposite faces, if desired. The grooves are parallel to each other, having an open top and bottom. They may be formed in the element by milling, especially if the element is of wood or pressed board. Alternatively, they may be formed into the element, if made of plastic. These elements are preferably of wood to allow easy breakage at selected segmental portions, as illustrated in FIG. 4, to allow the use of only a portion.

Figure 6:
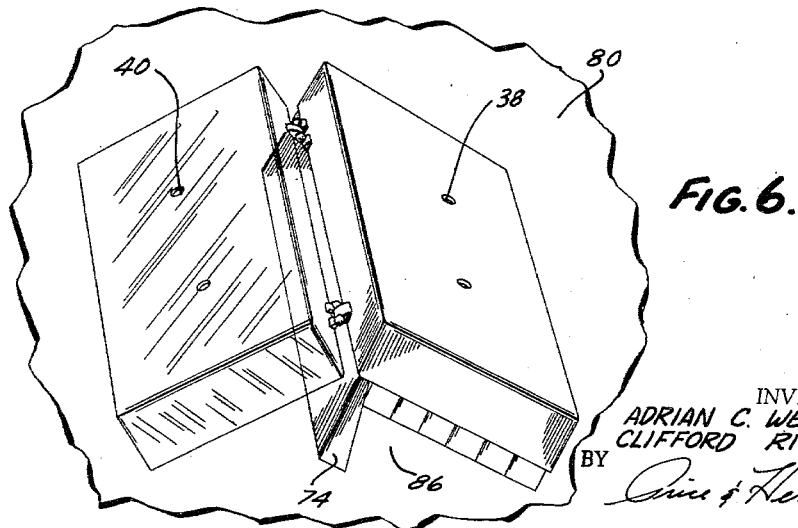
FIG. 6 is a perspective view of the novel assembly shown during the packaging process.

Each of these elements has a length slightly less than the length of the container base. When fitted together side by side, they almost but not quite fill the container to keep a definite gap or clearance 62 between the container walls and elements. They therefore can be readily inserted and removed when needed. The elements project slightly above the base as illustrated in FIGS. 1, 6 and 5, so that the ends of any element can be grasped between the thumb and forefinger to lift it out.

When the elements are fitted adjacent each other, the open sides of the grooves are enclosed by the adjcent block element to complete the peripheral enclosement of the grooves, thereby forming elongated individual cells. These cells are just large enough for the entry of one wax worm, normally being about ⅛ inch wide and ⅛ inch deep, with the entire cell length being substantially 1 inch long. The lower ends of the cells are closed by the container bottom while top is open.

When wax worms reach a certain degree of maturity, they seek a dark enclosure in which to build a cocoon. This cocoon surrounds the wax worm and contains a waxy substance which adheres the cocoon to the surface in which it is in contact. Consequently, the waxy substance adheres the cocoon to the walls of the cell in which it is formed. Therefore, it is preferable to include separator sheets 70 of paper, plastic, or the like, between the adjacent elements. The open side of the groove is therefore really closed by the sheet, which is held in place by the adjacent element. These sheets allow easy separation of the elements from each other, and removal of the worms. The sheet can be readily peeled off due to its flexibility. If the elements are adhered together with this waxy substance, they can be separated, but not nearly as conveniently. Further, it requires much greater force to break the waxy facial seal all at once, with possible disruption of the cocoons when the two are finally broken apart.

The method of packaging of wax worms in the containers is unique, and requires substantially little effort by the persons raising the bait. Specifically, in order to fill a package with wax worms, an elongated wedge 74 is inserted between the elements, preferably adjacent the last element 50 and the peripheral side wall of the container base. This accomplishes two functions—(1) forcing the elements together to prevent them from falling out of the container when the container is inverted, and (2) forming a propping or elevating means from a surface when the unit is inverted.

Referring specifically to FIG. 6, the container is inverted and rested upon a surface 80 which is the bottom of a container of wax worms. The wedge, which protrudes farther out of the container than the elements and the side wall, abuts the surface to angularly prop up a portion of the container slightly as illustrated in FIG. 6. Accordingly, a tunnel 86 is formed beneath the container, and more specifically, beneath the open ends of the individual cells. Wax worms seeking a place in which to build a cocoon are attracted into the tunnel and the dark individual cells. They consequently readily fill the container, with one worm entering each of the cells and creating a cocoon around itself. The cocoon inherently adheres to the side walls of the cell.

The grower of the worms, therefore, periodically inverts a plurality of the packages in the large container of hundreds of wax worms. The packages are periodically checked to see if they are filled. Once filled, the container is removed from the surface 80, and inverted to its upright position. The wedge 74 is removed and the container is closed. The container and its contents are then kept at a temperature of approximately 40° F. for an extended period of time as necessary, easily many months duration, to be sold as necessary.

The purchaser-fisherman takes the selected number of containers and places them into his refrigerator for later use. The cocoons remain inactive as long as the temperature is maintained at about this value. When the fisherman decides it is time for "sport," he merely removes the container or any portion of it from the refrigerator, and takes it with him. He opens the cover and slides out a particular element with its plurality of cocoon-covered wax worms as illustrated in FIG. 4. The separator sheet 70, adhered by the wax secretion and forming a protective covering over the cocoons, is peeled back to uncover the number of cocoons to be used. For example, if he wishes to remove two of the several cocoons in the particular element 50 he has selected for baiting his hook, he merely peels the sheet back two spaces, breaks off the section 50A of the block element containing the two wax worms, and replaces the remainder back in the container. The individual wax worms are then peeled out of their grooves, and placed on the fish hook in a very neat fashion.

It will be obvious from the foregoing description that the inventive concept involves a unique method of packaging, storing and using, as well as the unique container.

The wax worms have been found by experiment to be packaged rapidly and extremely conveniently in the above described fashion. Various additional advantages not specifically recited will, of course, be obvious to any sportsman upon studying this specification. Also, various additional minor modifications could conceivably be made in the particular structure and/or steps described without departing from this unique concept. Consequently, this invention is not to be limited to this specific preferred form illustrated, but only by the scope of the appended claims and the reasonable equivalents thereto.

We claim:

1. A wax worm bait storage assembly comprising: a container having a bottom and peripheral walls; a plurality of elongated elements slidingly inserted in said container on said bottom between said walls; said elements having adjacent side walls therebetween; said side walls having elongated grooves therein; said grooves being peripherally closed by the interfit of said elements to form elongated wax worm cells having open tops; said elements being normally slidingly removable from said container; and a wedge inserted temporarily into said container against one of said elements, and extending out of said container beyond said elements and side walls, to prop said container, when inverted, off a wax worm supporting surface while simultaneously locking said elements in said inverted position to allow entry of wax worms into said cells.

2. A method of packaging wax worms in a container having removable elements forming individual elongated wax worm cells therebetween, comprising the steps of: opening said container to expose the cells; inserting a wedge into said container to lock said elements in place in the container to prevent them from falling out of the container; inverting the container; propping up the container by means of a projecting portion of said wedge to hold said container in its inverted condition with the cells slightly above a surface supporting live wax worms, so that the ends of the cells are exposed to the wax worms for entry thereof; maintaining said container in its inverted propped position until the wax worms fill the cells; removing the container from the surface, removing said wedge and placing the container in an upright condition for storage; the removal of said wedge unlocking said elements to allow selective removal thereof.

References Cited by the Examiner

UNITED STATES PATENTS

| 137,791 | 4/73 | Mueller | 217—23 |
| 886,337 | 5/08 | Balken | 43—55 |
| 1,552,621 | 9/25 | Kytle | 217—21 |
| 2,670,562 | 3/54 | Gould | 43—55 |
| 2,748,747 | 6/56 | Crull | 119—1 |

FOREIGN PATENTS

| 523 | 5/83 | Italy. |

SAMUEL KOREN, *Primary Examiner.*